US008434205B2

(12) United States Patent
Dewell

(10) Patent No.: US 8,434,205 B2
(45) Date of Patent: May 7, 2013

(54) RELEASE TOOL

(76) Inventor: Douglas Dewell, Mission Viejo, CA (US)

( * ) Notice: Subject to any disclaimer, the term of this patent is extended or adjusted under 35 U.S.C. 154(b) by 321 days.

(21) Appl. No.: 12/972,570

(22) Filed: Dec. 20, 2010

(65) Prior Publication Data

US 2012/0151727 A1 Jun. 21, 2012

(51) Int. Cl.
*B25B 27/14* (2006.01)
*B23P 19/04* (2006.01)

(52) U.S. Cl.
USPC .................. 29/237; 29/257; 29/239; 29/276; 269/143; 269/156

(58) Field of Classification Search .................... 29/237, 29/238, 239, 276, 255, 270, 278, 257, 244; 269/43, 45, 143, 156, 249, 246
See application file for complete search history.

(56) References Cited

U.S. PATENT DOCUMENTS

| | | | | | |
|---|---|---|---|---|---|
| 3,334,405 | A | * | 8/1967 | Cann et al. | 29/257 |
| 4,921,234 | A | * | 5/1990 | Peterson | 269/147 |
| 5,430,919 | A | * | 7/1995 | Starks et al. | 29/252 |
| 5,477,598 | A | * | 12/1995 | Borner, Jr. | 29/227 |
| 5,692,437 | A | * | 12/1997 | Tabain | 100/231 |
| 5,860,203 | A | * | 1/1999 | Gehr, Jr. | 29/252 |
| 5,906,034 | A | * | 5/1999 | Weisshaar | 29/257 |
| 7,426,778 | B2 | * | 9/2008 | Nobusawa | 29/227 |
| 7,891,618 | B2 | * | 2/2011 | Carnevali | 248/228.6 |
| 8,282,088 | B2 | * | 10/2012 | Janson et al. | 269/6 |
| 8,322,697 | B2 | * | 12/2012 | Lin | 269/42 |
| 2012/0151727 | A1 | * | 6/2012 | Dewell | 29/237 |

* cited by examiner

*Primary Examiner* — Lee D Wilson
(74) *Attorney, Agent, or Firm* — Oakwood Law Group, LLP; Jie Tan

(57) ABSTRACT

A tool for releasing a tube from a fluid carrying tubing fitting having a C frame with a first end member and a second longer end member. A screw having a first end and a second end is rotatably coupled to the first and second end members and a knob coupled to the first end of the screw is provided for rotating the screw. A movable jaw is located between the first and second end members and has a threaded opening that engages the first end of the screw. The tool may include a bolster plate which is adapted to be attached to the second end member of the C frame or to the movable jaw to contact the back of a tubing fitting and has an adapter plate with a hook that engages the screw and has a slot for engaging a tube from the front of a tubing fitting.

20 Claims, 4 Drawing Sheets

RELEASE TOOL

BACKGROUND OF THE INVENTION

1. Field of the Invention

The present invention is directed to a release tool for use with quick connect tube connectors and nut & ferrule tube connectors, and, more particularly to a release tool for releasing a tubular conduit from a connector.

2. Description of Related Art

Snap-fit or quick connectors are useful in a wide range of applications. In particular, they are frequently employed for joining fluid carrying conduit in automotive and industrial applications. Release tools for separating the fluid carrying conduit from its fitting is known in the prior art. More specifically, by way of example, U.S. Pat. No. 7,062,833 to Schann, et al. discloses a sheath that enters between each tab and the cylindrical wall until the means that prevents the withdrawal of locking tabs are released.

U.S. Pat. No. 5,533,761 to Ostrander, et al. discloses axial sliding a release member through an open end of a quick connector into engagement with a retainer mounted within the quick connector to effect release of legs of the retainer from an annular flange on the fitting and disengagement of the connector from the fitting.

U.S. Pat. No. 5,378,025 to Szabo discloses engaging surfaces formed between fingers on an inner sleeve engage deflectable legs on a retainer mounted in the bore of a female connector part where a release member is forcibly urged into the bore in the female connector part to deflect the legs radially outward so as to permit separation of a radially expanded flange on a male conduit from the female connector part.

U.S. Pat. No. 5,228,788 to McNaughton, et al. discloses a plurality of planar surfaces at an outer peripheral surface which bias retainer legs radially outwardly to allow removal of a tube.

U.S. Pat. No. 5,226,230 to Klinger discloses an elongated handle and a bifurcated body including first and second complimentary body halves which are resiliently carried by the handle which embrace an outer surface of the connector to overlie radial openings. An abutment member which extends from the body halves penetrates the female connector opening(s) to displace the retaining element from an engaged position to a released position.

U.S. Pat. No. 5,213,376 to Szabo discloses a squeeze-to-release quick connector for engaging a flanged male member includes a cylindrical body portion which is open at one end for receiving the male member and forms a conduit receiving adapter at its opposite end.

U.S. Pat. No. 5,084,954 to Klinger discloses a quick connector release tool includes a handle and a bifurcated body resiliently mounted to the handle and including one or more finger members extending from each half of the body which form a tapered fitting receiving passageway which is adapted to disconnect male tubular fittings of varying diameters.

U.S. Pat. No. 5,024,468 to Burge discloses a release tool for releasing a tube which is held by the gripper ring of the fitting. The release tool has a thin, cylindrical section portion which can be received about a tube held in the fitting and then inserted in the fitting raises the gripper to release the tube.

SUMMARY OF THE INVENTION

In an exemplary embodiment of the present invention, there is disclosed a tool for releasing a tube from a fluid carrying tubing fitting which uses a slotted ringed sleeve that surrounds the tube, to lock the tube into the body of the fitting (push release fluid fitting), and requires the sleeve to be depressed into the body to release the tube, with such tool having: a C frame with a first end member (screw support) and a second longer end member (a fixed jaw). A screw having a first end and a second end is rotatably coupled to the first and second end members and a knob that is coupled to the first end of the screw is provided for rotating the screw. A movable jaw is located between the first and second end members and has a threaded opening that engages the first end of the screw. The tool includes a bolster plate having a hook that engages the screw, and which is adapted to be attached to the second end member (the fixed jaw) of the C frame or to the movable jaw to contact the back of a tubing fitting, and an adapter jaw having a hook that engages the screw and has a slot for engaging a tube from the front of a tubing fitting. Such adapter jaws and bolster plates are held in place with either magnets or screws. The purpose of the adapter jaws is to increase the size range of the tool with respect to different hose sizes, In another exemplary embodiment of the invention, there is disclosed a tool for releasing a tube from a fluid carrying tubing fitting which uses a ferrule and nut to secure the tube in the threaded body of the fitting, with such tool having: a C frame with a first end member and a second longer end member. A screw having a first end and a second end is rotatably coupled to the first and second end members and a knob that is coupled to the first end of the screw is provided for rotating the screw. A movable jaw is located between the first and second end members and has a threaded opening that engages the first end of the screw. The tool includes adapter jaws having a hook that engages the screw and has a U shaped slot and a thin U shaped blade in the slot, for engaging a tube ferrule from the front of a tubing fitting, engaging the ferrule between the ferrule ring and fitting body. Such adapter jaws increase the range of the tool with respect to different hose sizes, and fitting types, and are used in pairs of the same size.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
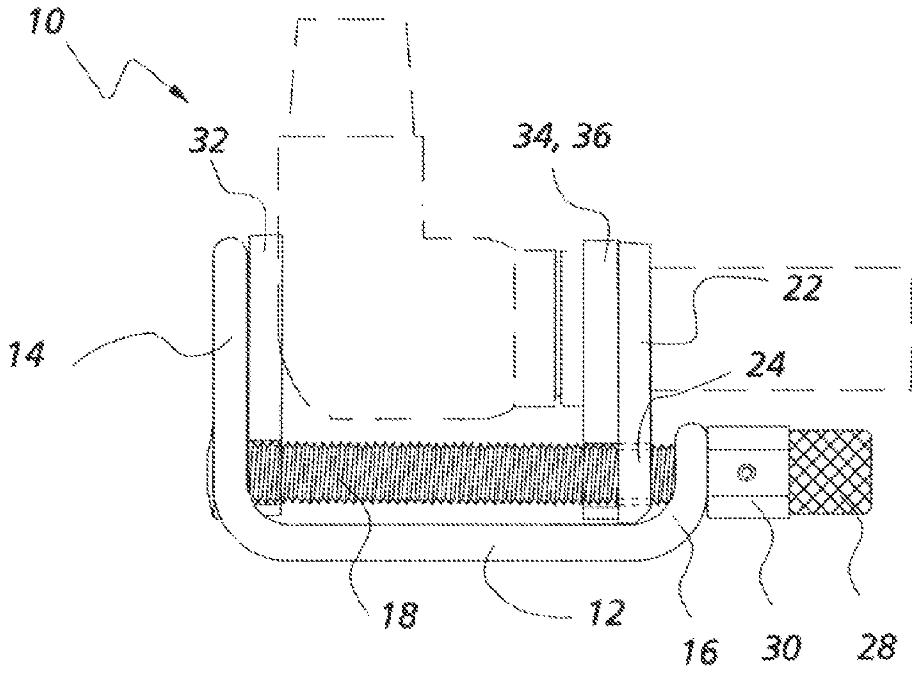
FIG. 1 is a side view of a release tool for a push release fluid fitting shown with a typical push release fluid fitting in phantom in accordance with the principles of the invention.
Figure 2:
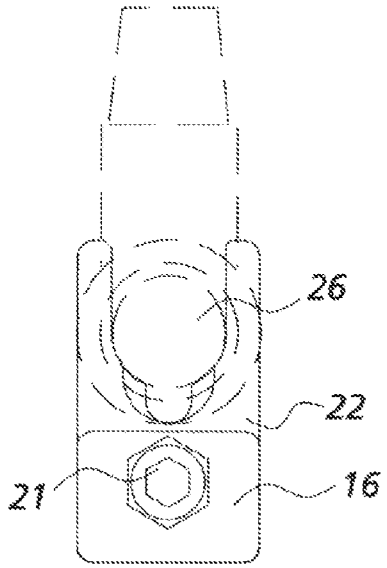
FIG. 2 is a right end view of the release tool of FIG. 1.
Figure 3:
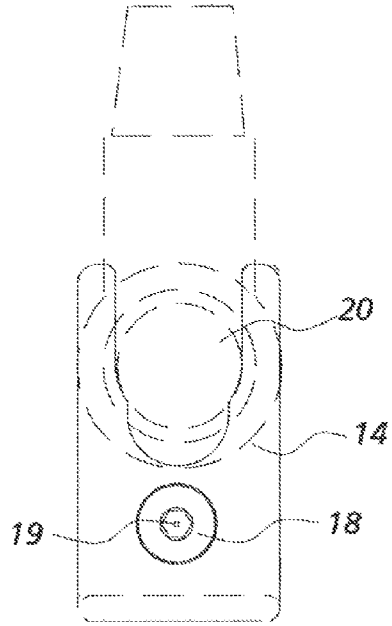
FIG. 3 is a left end view of the release tool of FIG. 1.

Referring to FIGS. 1, 2, and 3, there is shown a release tool for a push release fluid fitting shown with a typical push release fluid fitting in phantom in accordance with the principles of the invention.

The release tool 10 consists of a "C" frame 12, formed from a suitable tool material, with the ends 14, 16 bent at 90 degrees to form a "C" shape. The bent ends are preferably of lengths suitable to the maximum size fitting provided for, with holes through the ends allowing a screw 18 to be fitted. The large end 14 of the C frame 12 (the fixed jaw), has a longitudinal slot 20 for the largest tube size provided for, but not limited to ⅝ of an inch or ¾ of an inch.

A movable jaw 22 has a threaded hole 24 to fit screw 18 at one end, and a slot 26 centered along the long axis, from near center to end, to accommodate one or more sizes of tubes such as is used with typical air/liquid fluid tube fittings.

Screw 18 is preferably, a single lead screw, of either left or right hand, depending upon the configuration of the tool and its application, with a circular head with a female hexagonal indentation 19 (from FIG. 3), suitable for being driven by a hex wrench, a preferably rolled or ground thread, a machined diameter to fit a knob, a flat for a set screw, or a cross drilled hole for a pin through a fixed knob, and a length sufficiently longer than the "U" section of the C frame 12 in order to extend from the far side of fixed jaw 14 in C frame 12 through short end or screw support, 16, and engage the knob bore in hex 30 of the knob.

The knob has a combination finger section 28 with a female hexagonal drive 21 inside, and wrench receiving section 30. The wrench section has a hexagon shape suitable for engagement of a socket or wrench. The finger section is a cylindrical grip with a knurled or fluted surface finish having a diameter that is slightly smaller than the hexagon and has a length suitable for gripping with a thumb and forefinger, and has a female hexagonal indentation 21 (See FIG. 2), suitable for being driven by a hex wrench. The knob is located at the first end of the screw 18 to allow hand or wrench operation of screw 18.

Figure 4:
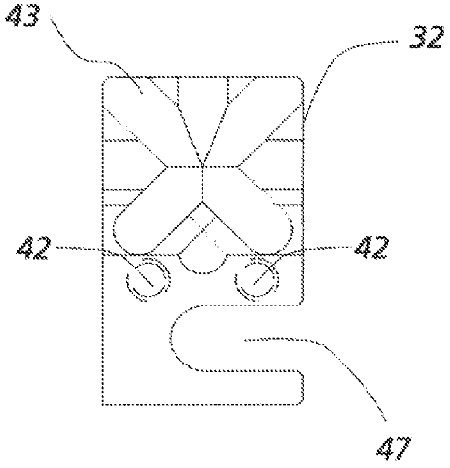
FIG. 4 is a front view of a bolster plate and its groove feature.

Referring to FIG. 4, there is shown a view of a bolster plate. Bolster plate 32 allows the back of the fitting to be held, and is attached to either the inside of the fixed jaw, the long end 14 of the C frame 12, or the surface of the movable jaw 22 (see FIG. 1) which faces the fixed jaw, the long end 14 of the C frame 12. The front surface of the bolster plate has a pattern of grooves 43 across the surface at various angles to allow the tool to grip the fitting without slipping and either 1 or more magnets imbedded into the far side surface, or a threaded hole for a locking screw.

Figure 5:
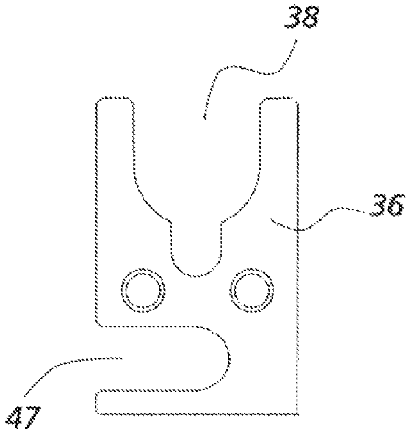
FIG. 5 is a front view of a ⅝-¼ inch combination adapter jaw.
Figure 6:
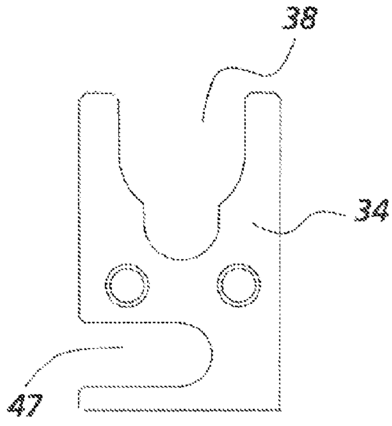
FIG. 6 is a front view of a ⅝-⅜ inch combination adapter jaw.

Looking at FIGS. 1, 5 and 6, adapter jaws 34, 36, are provided to allow the C frame 12 to be used with various size fittings and tubes. The adapter jaws have longitudinal U shape slots 38 with widths of 0.250, 0.375, 0.500, and 0.625 inches and a length which is about 0.125 of an inch greater than the width. Adapters with larger or smaller inch sizes, and metric sizes are envisioned as well. The slots may be single, i.e., one size per adapter jaw or a combination of sizes, i.e., a 0.250 inch wide slot bisecting the bottom of a 0.625 inch wide slot which allows one adapter jaw to be used with both a ¼ inch tube and a ⅝ inch tube without having to change to another adapter jaw. Other combinations of sizes are possible, as well.

In operation, the movable jaw 22 which is threaded on screw 18 which passes through the holes in the ends of the C frame 12 moves along the screw 18 in the open section of the C frame 12, when turned by the knob on the end of the screw.

The bolster plate 32 allows the back of the fitting to be held securely, and is attached to either the inside face of the fixed jaw 14 of the C frame, or to the opposing side of the movable jaw 22 with an arrangement of a hook 47 and a magnet or magnets 42 (see FIG. 4), or a threaded hole and a screw fastener. The hook 47 is a crosswise slot that loosely engages the screw 18 which, when combined with the magnet(s) 42 or alternately, a screw through the slot in the adjacent tool face, will prevent the inadvertent disengagement of the bolster plate 32.

Adapter jaws 34, 36 are provided to accommodate various tube and fitting sizes. For example the jaws can have different slot sizes, such as, but not limited to 0.250, 0.375, 0.500, and 0.625 inches. A selected adapter jaw is attached to the movable jaw 22 face, or alternately, to the inner surface of the fixed jaw, or large end of the C frame 12. Attachment is by one of various means which can include but not limited to an arrangement of the hook 47 and magnet 42, or a hook and a screw fastener. The hook 47 is a crosswise slot (see FIG. 4) that loosely engages screw 18 which, when combined with the magnet 42 or alternately a screw through the slot in the adjacent tool face, will prevent the inadvertent disengagement of the bolster plate 32.

The relative positions of the bolster plate 32 and the adapter jaws 36, 38 can be reversed to accommodate the orientation of the fitting.

In an embodiment, two adapter jaws can be used instead of the bolster plate.

In another embodiment, the tool can have a C frame that is sized for a specific range of fittings such as, i.e., a one-half inch single or one-quarter and five-eighths inch tube size with the fixed jaw or large end of the C frame closed and the slots machined into the movable jaw of the preferred tube size. This embodiment allows the tool to be used on one or alternately, two fitting sizes.

In another embodiment, the tool has a smaller C frame with a slot machined into the fixed jaw, or large end, to fit behind the hex of a straight fitting and the slot in the movable jaw sized to receive a suitable tube size.

The tool disclosed surrounds the fitting, which may be a 90 degree elbow or a straight fitting, engages one or more "back" surfaces, straddles the tube and engages the ring around the tube. The ring is the end of a sleeve which extends into the body of the fitting. Depressing the end of the sleeve causes the slotted inner ends of the sleeve to expand and release their grip on the tube.

Dirt getting into the clearance between the sleeve, body and tube, or corrosion of the metal components of metal fittings causes the sleeve to be locked to the body and/or tube which prevents easy disengagement of the sleeve and tube assembly. By placing the tool in position on the fitting, disengagement is obtained by turning the knob to advance the movable jaw and any attached adapter plate against the ring surrounding the tube. The bolster plate attached to the fixed or movable jaw, engages the rear side of the fitting, if an elbow, or an adapter jaw 34, 36 can be used to engage the back side of the hexagonal body of the fitting if a straight fitting, to secure the position of the tool. If more torque than can be applied by finger pressure is required to turn the screw, a wrench such as a socket, box or open end wrench or hex driver, may be used to turn the knob. Once the ring is depressed against the body of the fitting, the fingers are in a position to release the tube, and the tube is removed by pulling it out of the fitting.

The knob can be cross drilled for a pin, or tapped for a set screw. A smooth hole which goes fully or partially thru is provided to fit the machined end of the screw. A female hexagonal drive depression 21 can be provided in the knob portion 28 to receive a hex driver.

The bolster plate has crosswise grooves at 45 degrees, both sides of center, and 90 degrees centrally located.

The adapter jaws are slotted to clear and wrap around the screw as a hook to allow the jaw to slide sideways into engagement with the screw and held to the movable jaw or the fixed jaw of the C frame with a centrally located magnet(s) or fastening screw, and having a centrally located groove along the long axis which is sized to a tube width of 0.250, 0.375, 500, or 0.625 of an inch. Some grooves can be combined such as a 0.250 and a 0.625 groove for use with two sizes of tubes. Additional inch and metric sizes are possible, as well.

In use, a user selects the bolster plate and an appropriate adapter jaw for the size tube at hand, and installs them on the tool in whichever position is required as is determined by the orientation of the fitting and its tube. Now, holding the tool in one hand, or optionally, at the end of a socket which engages the knob hex, or a hex driver engaging the end of the knob, user places the frame of the tool around the fitting, and depending upon which direction the fitting and its tube are oriented, user engages the grooved surfaces of the bolster plate with the back side of the body of the fitting with the slotted adapted plate straddling the tube. Now, turning the screw in a direction which will cause the slider to close on the fitting (this depending upon which hand of screw is incorporated, as determined by the various embodiments or design application of the tool), whether the backside or tube side, and depresses the ring of the locking sleeve of the fitting to cause it to release its grip on the tube engaged in the fitting. The tube can now be released from the fitting by pulling on it.

Figure 7:
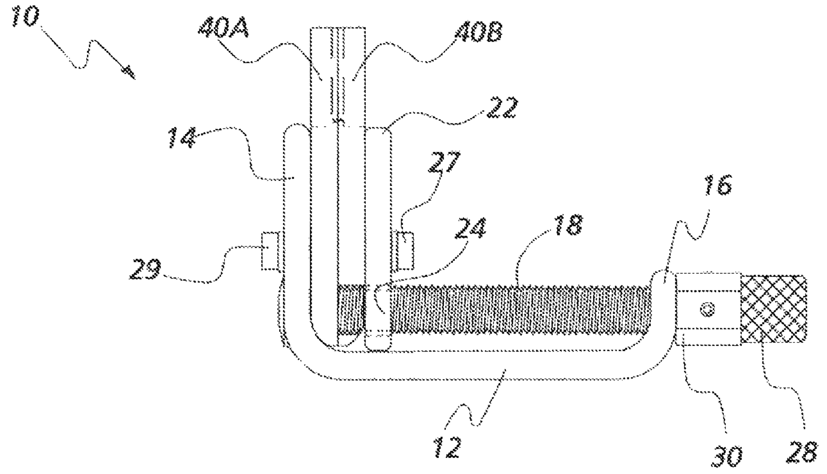
FIG. 7 is a side view of another embodiment of a release tool for use on threaded nut-and-ferrule type fluid fittings, in accordance with the principles of the invention.
Figure 8:
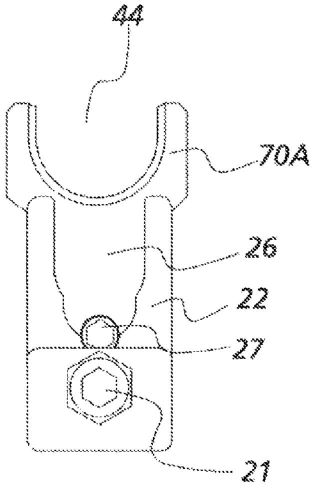
FIG. 8 is a right end view of the release tool of FIG. 7.

Referring to FIG. 7, there is shown a side view of another embodiment of a release tool for a push release fitting with adapters mounted allowing the removal of the tube from a nut & ferrule type fluid fitting and FIG. 8 is a right end view of the release tool of FIG. 7 in accordance with the principles of the invention.

As noted above in the brief description of the drawings, similar elements in the various embodiments are given similar reference numerals.

Continuing with FIGS. 7 and 8, release tool 10 consists of a "C" frame 12, ends 14, 16 bent at 90 degrees to form a "C" shape. The bent ends are preferably of lengths suitable to the maximum size fitting provided for. Machined holes through the ends allow for a screw 18 to be fitted.

A movable jaw 22 has a screw threaded hole 24 to fit screw 18 at one end, a slot 26 centered along the long axis, from near center to end, to accommodate one or more sizes of tubes such as is used with typical air/liquid fluid tube fittings, and a screw clearance opening for receiving a screw 27 that threads into an adapter jaw 40B and attaches the adapter jaw to the movable jaw 22. If magnets are used for securement, screw clearance openings can be used to engage the magnet.

Another screw clearance opening is located in the fixed jaw 14 of frame 12 for a screw 29 that threads into a mating adapter jaw 31B. If magnets are used for securement, screw clearance openings can be used to engage the magnet.

Screw 18 is preferably, a single lead screw, with a preferably rolled or ground thread, a round head with a centrally located female hexagonal impression 19 (FIG. 3) suitable for driving with a hex driver, a machined diameter to fit a fixed knob, and with a length equal to that of the "U" section of the tool plus the length of the head and engagement length of the knob.

The knob has a combination finger section 28 and wrench receiving section 30. The wrench section has a hexagon shape suitable for use with a socket or wrench. The finger section is a cylindrical grip with a knurled or fluted surface finish having a diameter that is slightly smaller than the hexagon and has a length suitable for gripping with a thumb and forefinger, and a female hexagonal depression 19 (See FIG. 3) in 28 suitable for driving with a hex driver.

The knob is located at the end of the screw 18 to allow hand, or wrench or hex driver operation of screw 18.

Figure 9:
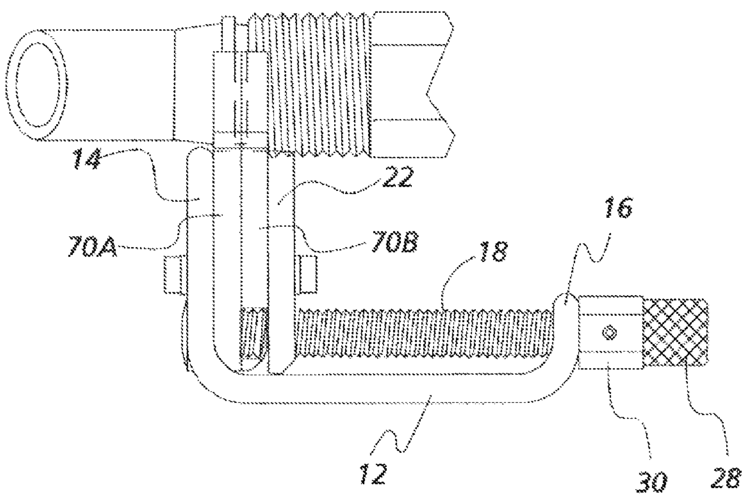
FIG. 9 is a side view of the release tool for a push release type fluid fitting of FIG. 7 shown with adapter jaws as applied to a nut-and-ferrule type fluid fitting for hose removal in accordance with the principles of the invention.

Referring to FIG. 9, there is a side view of the release tool for a push release fluid fitting of FIG. 7 with two adapter jaws 70A and 70B engaged with a nut-and-ferrule type fluid fitting for hose removal in accordance with the principles of the invention.

Figure 10:
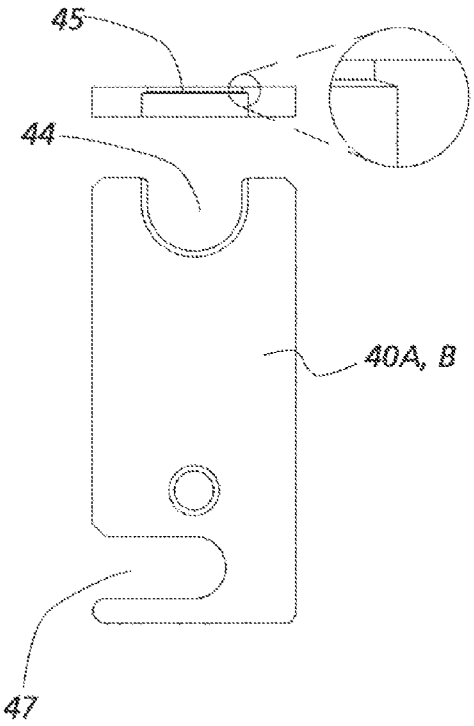
FIG. 10 is a front view and end view with close up view of an adapter jaw of the release tool of FIG. 7 for a three-eighths inch line fitting.
Figure 11:
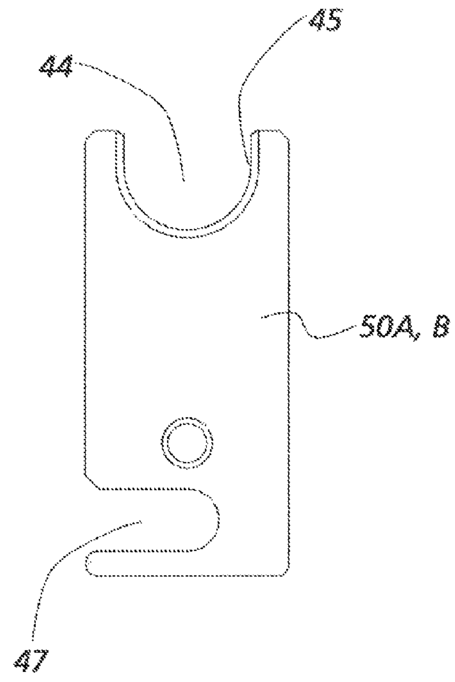
FIG. 11 is a front view of an adapter jaw of the release tool of FIG. 7 for a one-half inch line fitting.
Figure 12:
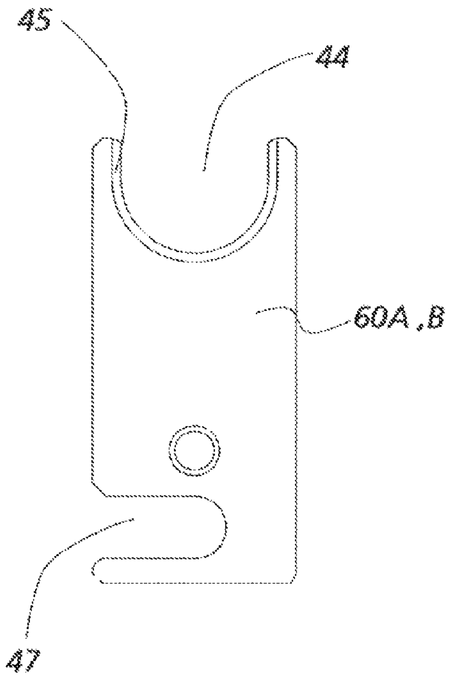
FIG. 12 is a front view of an adapter jaw of the release tool of FIG. 7 for a five-eighths inch line fitting.
Figure 13:
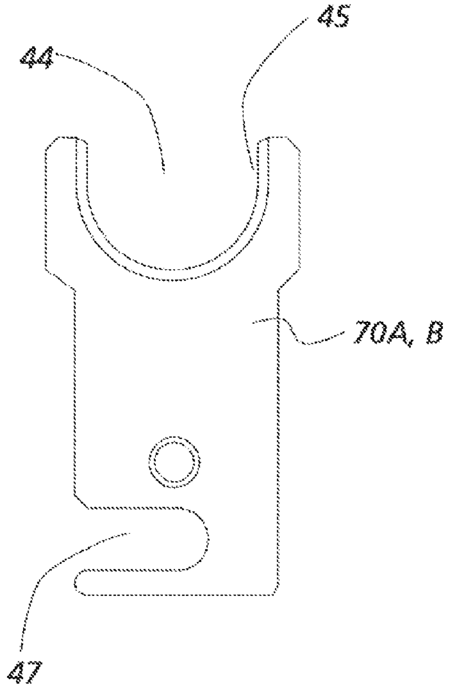
FIG. 13 is a front view of an adapter jaw of the release tool of FIG. 7 for a three-quarters inch line fitting.

Referring to FIGS. 9 and 10, there is shown a view of an adapter jaw 40 for a three-eighths inch line fitting. Adapter jaws 40, 50, 60, and 70 are used in mating pairs (40A and 40B, 50A and 50B, and so on) where one adapter jaw is attached to the surface of the movable jaw 22 (see FIG. 9) which faces the fixed jaw 14 of the C frame 12 and the mating adapter jaw is attached to the inner surface of the fixed jaw 14 of the C frame 12. The thin U shaped blades 45 FIG. 10 machined into each adapter slot engage the gap between the ferrule ring and the end of the threaded body of the fitting, causing them to separate when the screw 18 is turned, the direction determined by the hand of the screw 18. This separating motion pulls the ferrule and tube from the body of the fitting. Adapter jaws 40, 50, 60 & 70 have a thin semicircular U shaped blade 45 FIG.

10 machined into them allowing them to be nested together to engage the gap between the ferrule ring and body of the fitting.

Looking at FIGS. 10-13, adapter jaws 40, 50, 60, and 70 are provided in pairs to allow the C frame 12 to be used with various size fittings and tubes. The adapter jaws have U shape slots 44 with semicircular U shaped blades 47 FIG. 10 machined into them, in widths to fit the ferrules of 0.375, 0.500, 0.625 and 0.750 inch tubes and a length which is about 0.125 of an inch greater than the width. Adapter jaws 40, 50, 60 & 70 have a thin semicircular U shaped blade 45 machined into them allowing them to be nested together to engage the gap between the ferrule ring and body of the fitting. Additional inch and metric sizes are possible.

In operation, movable jaw 22 which is threaded on screw 18 which passes through the holes in the ends of the C frame 12 moves along the screw 18 in the open section of the C frame 12 when turned by the knob on the end of the screw.

Looking at FIG. 9, adapter jaws 70 A and 70B when mounted to the inside face of the fixed jaw 14 of the C frame 12, and movable jaw 22, and secured by hook 43 which is a crosswise slot that loosely engages the screw 18, and screws 27, & 29, or optionally, magnet(s) 42, nest together when movable jaw 22 is closed allowing the two thin blades to engage the slot between the ferrule ring and the fitting body and separate the ferrule & tube assembly from the body of the fitting when the screw 18 is turned.

Adapter jaws 40, 50, 60, and 70 are provided to accommodate various tube and fitting sizes. For example the adapter jaws, which are used in pairs, can have different slot sizes, such as, but not limited to those appropriately sized for 0.375, 0.500, 0.625 and 0.750 inch tube ferrules. A selected adapter plate is attached to the movable jaw 22 face and a mating adapter plate of the same size is attached to the fixed jaw of the C frame 12. Attachment may be by one of various means which can include but not limited to an arrangement of a magnet(s) or a screw fastener. The hook 47 is a crosswise slot (see FIG. 10) that loosely engages screw 18 which, when combined with a screw will prevent the inadvertent disengagement of the adapter plate.

The adapter jaws are slotted to clear and wrap around the screw as a hook to allow the plate to slide sideways into engagement with the screw and be held to the slider or long end of the C frame with a centrally located magnet(s) or fastening screw, and having a centrally located groove along the long axis which is sized to fit the outer ring of a ferrule for a tube width of 0.375, 0.500, 0.625 or 0.750 of an inch.

In use, a user selects an appropriate pair of adapter plates for the size tube at hand, and installs them on the tool, one adapter plate fastened to the inner surface of the fixed jaw 14 of C frame 12, and the other to the facing side of the movable jaw 22, with the U shaped slot blade 47 side facing toward the other adapter jaw, either magnetically, of with screw fasteners. The screw 18 is then rotated to bring the two adapter plates into contact with each other, in a nested position with the slot blades adjacent to each other. Now, holding the tool in one hand, or optionally, at the end of a socket or hex driver, the user engages the blades of the adapter jaws into the slot between the ferrule ring and body of the fitting, and turns the screw 18 causing the adapter jaws to separate, pulling the ferrule and tube from the body of the fitting.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are entitled.

What is claimed is:

1. A tool for releasing a tube from a fluid carrying tube fitting comprising:
- a C frame having a base member connected to a first end member and a second end member that is longer than the first end member;
- a screw having a first end rotatably coupled to the first end member and a second end rotatably coupled to the second end member;
- a knob coupled to the first end of the screw for rotating the screw;
- a movable jaw located between the first and second end members and having a threaded opening that engages the first end of the screw; and
- an adapter jaw having a hook that engages the screw and a slot for engaging a tube from the front of a tube fitting.

2. The tool of claim 1 wherein the longer second end member of the C frame has a slot for receiving a tube from the front of a tube fitting.

3. The tool of claim 2 wherein the slot has a U shape which has a width that is sized to receive the largest size tube anticipated.

4. The tool of claim 1 wherein the screw is a single lead screw, of either left or right hand thread depending upon configuration and application of tool.

5. The tool of claim 1 wherein the knob has a second section configured to allow tool actuation of the screw and a first section configured to allow finger actuation of the screw, and a hexagonal female drive indentation in the center of the first end to allow hex driver actuation of the screw.

6. The tool of claim 5 wherein the first section of the knob is located at the end of the knob and the second section of the knob is located between the first section and the first end of the screw.

7. The tool of claim 6 wherein the first section of the knob has a knurled or fluted surface.

8. The tool of claim 6 wherein the second section of the knob has a hexagon shape.

9. The tool of claim 8 wherein the first section has a thickness that is smaller than the thickness of the second section.

10. The tool of claim 1 wherein the movable jaw includes a slot for receiving a tube from the front of a tube fitting.

11. The tool of claim 10 wherein the slot is centered along the long axis of the movable jaw from near center to end.

12. The tool of claim 11 wherein the slot has a U shape.

13. The tool of claim 1 wherein the slot in the adapter plate is a single slot with a width sized to receive a tube having a diameter of between 0.250 and 0.750 of an inch.

14. The tool of claim 13 wherein the length of each slot is more or less 0.125 of an inch greater than its width.

15. The tool of claim 1 further comprising a bolster plate adapted to be attached to the second end member of the C frame or the movable jaw to contact the back of a tubing fitting.

16. The tool of claim 15 wherein the slot in the adapter plate is a combination of at least two widths where the lower section of the slot has a width that is less than the width of the slot immediately above it.

17. The tool of claim 16 wherein a slot having a width of 0.250 of an inch that bisects the bottom of a slot having a width of 0.625 of an inch to allow a one quarter of an inch tube and a five eighths of an inch tube to be released with a single adapter plate.

18. The tool of claim 17 wherein a slot having a width of 0.375 of an inch that bisects the bottom of a slot having a width of 0.625 of an inch to allow a three eighths of an inch tube and a five eighths of an inch tube to be used with a single adapter plate.

19. A tool for releasing a tube from a fluid carrying tube fitting comprising:

a pair of tool adapter jaws, each having a U shaped slot that has a thin tapered U shaped blade along the edges of the slot and adjoining one side of the jaw, and a hook that engages a screw.

20. The tool of claim 19 where one adapter jaw is affixed to a fixed jaw of a C frame, and the other adapter jaw is affixed to a movable jaw such that the U shaped blades face each other and are adapted to be brought into position adjacent to each other with the U shaped blades abutting each other by rotation of the screw to engage and enlarge a gap between a tube mounted ferrule and a fitting body in which the ferrule & tube are engaged, to extract the ferrule and tube from the body of the fitting.

* * * * *